(12) United States Patent
Dong et al.

(10) Patent No.: US 12,363,788 B2
(45) Date of Patent: Jul. 15, 2025

(54) SYSTEM AND METHOD FOR MULTIPLE DISCONTINUOUS RECEPTIONS FOR ONE CELL GROUP

(71) Applicant: ZTE CORPORATION, Guangdong (CN)

(72) Inventors: Fei Dong, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 298 days.

(21) Appl. No.: 17/737,724

(22) Filed: May 5, 2022

(65) Prior Publication Data
US 2022/0408511 A1    Dec. 22, 2022

Related U.S. Application Data

(63) Continuation of application No. PCT/CN2019/116059, filed on Nov. 6, 2019.

(51) Int. Cl.
H04W 76/28    (2018.01)

(52) U.S. Cl.
CPC .................... *H04W 76/28* (2018.02)

(58) Field of Classification Search
CPC ............... H04W 76/28; Y02D 30/70
See application file for complete search history.

(56) References Cited

U.S. PATENT DOCUMENTS

| | | | |
|---|---|---|---|
| 11,224,088 B2 * | 1/2022 | Islam | H04B 7/088 |
| 2011/0199910 A1 * | 8/2011 | Oh | H04W 52/0229 |
| | | | 370/241 |
| 2015/0282208 A1 | 10/2015 | Yi et al. | |
| 2021/0105857 A1 * | 4/2021 | He | H04W 80/02 |
| 2022/0346008 A1 * | 10/2022 | Xu | H04L 5/001 |

FOREIGN PATENT DOCUMENTS

| | | |
|---|---|---|
| CN | 102036348 A | 4/2011 |
| CN | 102461320 A | 5/2012 |
| CN | 109429551 A | 3/2019 |
| CN | 109769309 A | 5/2019 |
| WO | WO-2018/025070 A1 | 2/2018 |

OTHER PUBLICATIONS

Huawei et al. "NRS presence on non-anchor carriers for paging" 3GPP TSG RAN WGI Meeting #98bis, RI-1910094 Oct. 20, 2019(Oct. 20, 2019) Chongqing, China (7 pages).
International Search Report and Written Opinion for PCT Appl. No. PCT/CN2019/116059 mailed Aug. 5, 2020 (7 pages).
Ericsson et al., "cDRX enhancement for CA" 3GPP TSG-RAN2 Meeting #107bis, R2-1913196, Oct. 18, 2018, Chongqing, China (14 pages).
First Examination Report on AU Appl. No. 2019473645 dated Mar. 3, 2023.
Office Action for CN App. No. 202310115483.9 dated May 22, 2025 (with English translation, received May 29, 2025, 12 pages).

* cited by examiner

*Primary Examiner* — Mansour Oveissi
(74) *Attorney, Agent, or Firm* — Foley & Lardner LLP (57) ABSTRACT

In one embodiment, a method performed by a wireless communication device includes receiving a first discontinuous reception (DRX) configuration corresponding to a first DRX group including a first subset of cells (e.g., a first cDRX group) in a cell group and receiving a second, different DRX configuration corresponding to a second DRX group including a second subset of cells (e.g., a second cDRX group) in the cell group.

18 Claims, 3 Drawing Sheets

SYSTEM AND METHOD FOR MULTIPLE DISCONTINUOUS RECEPTIONS FOR ONE CELL GROUP

CROSS-REFERENCE TO RELATED APPLICATION

This application claims the benefit of priority under 35 U.S.C. § 120 as a continuation of PCT Patent Application No. PCT/CN2019/116059, filed on Nov. 6, 2019, the disclosure of which is incorporated herein by reference in its entirety.

TECHNICAL FIELD

The disclosure relates generally to wireless communications and, more particularly, to systems and methods for multiple discontinuous receptions for one cell group.

BACKGROUND

Network traffic is often bursty, with occasional periods of transmission activity followed by long periods of inactivity. Even while there is no traffic between a network and a UE, the UE listens for network traffic, costing the UE additional power consumption. To reduce power consumption, NR includes mechanisms for discontinuous reception. In discontinuous reception, the UE goes to sleep mode for a certain period of time and wakes up periodically to check if there is any data coming from the network. If there is no data, the UE goes back to sleep and repeats the cycle.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication device includes receiving a first discontinuous reception configuration corresponding to a first DRX group including a first subset of cells in a cell group and receiving a second, different DRX configuration corresponding to a second DRX group including a second subset of cells in the cell group.

In some embodiments, the wireless communication device is currently using the first DRX configuration. In some embodiments, the first DRX configuration includes a first drx-Retransmission downlink timer and/or a first drx-Retransmission uplink timer, and the second DRX configuration includes a second drx-Retransmission downlink timer and/or a second drx-Retransmission uplink timer. In some embodiments, the wireless communication device determines to be in an active state based on identifying that at least one of either the first drx-Retransmission downlink timer is running or the second drx-Retransmission downlink timer is running, either the first drx-Retransmission uplink timer is running or the second drx-Retransmission uplink timer is running, a scheduling request, which is pending, has been sent in the first subset of cells, and a scheduling request, which is pending, has been sent in any of the first subset of cells and the second subset of cells.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A. Network Environment and Computing Environment

Figure 1:
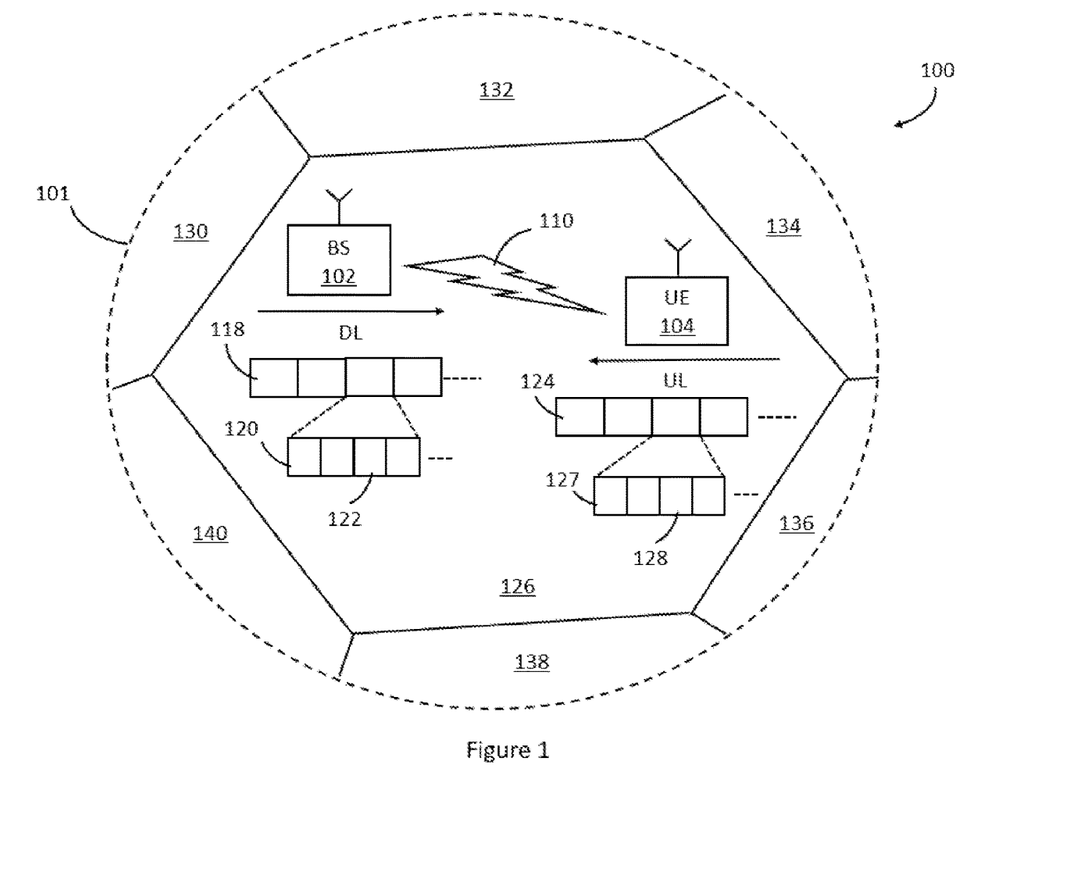
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
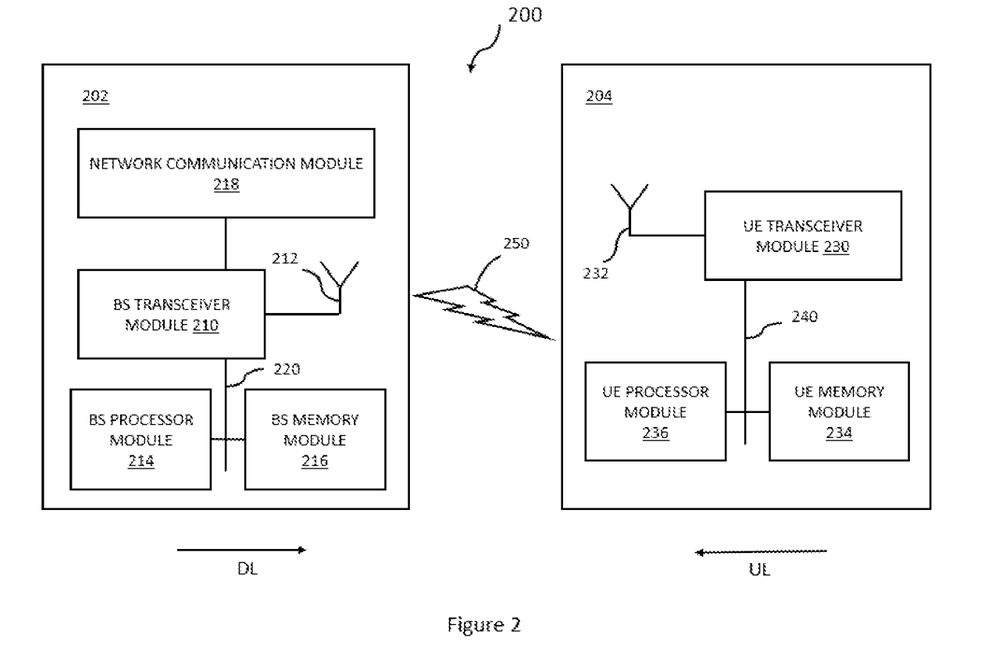
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

B. Multiple Discontinuous Receptions for One Cell Group

A DRX (discontinuous reception) group is one or multiple serving cells in a cell group sharing one DRX configuration. In some embodiments, the DRX group can be configured based on a PUCCH group. In some embodiments, the DRX group includes one or more UEs (e.g., a user equipment, the UE 104, the UE 204, a user device, a terminal, a wireless communication device, etc.) sharing the one DRX configuration. In some embodiments, a cell group may include several DRX configurations. In some embodiments, a DRX group and/or configuration includes a cDRX (connected mode DRX) group and/or configuration, respectively. In some embodiments, a cDRX group includes one or more UEs sharing a cDRX configuration. In some embodiments, a wireless communication device receives a first discontinuous reception (DRX) configuration corresponding to a first DRX group including a first subset of cells (e.g., a first cDRX group) in a cell group. In some embodiments, the wireless communication device receives a second, different DRX configuration corresponding to a second DRX group including a second subset of cells (e.g., a second cDRX group) in the cell group. In some embodiments, the wireless communication devices receives the first DRX and/or the second DRX from a wireless communication node (e.g., a base station, a BS, the BS 102, the BS 202, a gNB, a network, etc.).

In some embodiments, the cDRX configuration can be released/configured separately for each cDRX group. In some embodiments, the cDRX configuration can be released/configured by RRC signaling. In some embodiments, the cDRX configuration for each cDRX group can be activated/deactivated via a MAC CE. In some embodiments, this MAC CE includes at least one of the following information: a cDRX group identifier, a main serving cell identifier in one cDRX group, activation/deactivation indication.

A UE in a DRX group can be in a state such as an active state (e.g., active state, active status) or a sleep state. In some embodiments, a UE in the active state monitors signaling (e.g., downlink control signaling such as PDCCH—physical downlink control channel). In some embodiments, a UE in the sleep state stops monitoring the signaling to reduce power consumption.

A DRX cycle is a duration of a sum of one 'ON time' (e.g., time in active state) and one 'OFF time' (e.g., time in sleep state). The onDurationTimer is a duration of 'ON time' within one DRX cycle. A drx-Inactivity Timer specifies how long the UE remains, or should remain, 'ON' after reception of a PDCCH. When the drx-InactivityTimer timer is on, the UE remains in 'ON state,' which may extend the UE ON period into the period which is 'OFF' period otherwise. A drx-Re transmission Timer specifies a maximum number of consecutive subframes of signaling the UE should remain active to wait an incoming retransmission after the first available retransmission time. The drx-Retransmission Timer includes a timer for downlink signaling (drx-RetransmissionTimerDL) and a timer for uplink signaling (drx-RetransmissionTimerUL).

Some embodiments define the active state for when multiple cDRX groups are configured to the UE. In some embodiments, a UE in a cDRX group is in the active state responsive to at least one of the following conditions. The first condition is that a drx-onDuration Timer is running, wherein the drx-onDurationTimer is configured for the cDRX group. The second condition is that a drx-onInactiviyTimer is running, wherein the drx-onInactivitynTimer is configured for the cDRX group. The third condition is that a drx-RetransmissionTimerDL is running, wherein the drx-RetransmissionTimerDL is configured for the cDRX group or other cDRX groups. The fourth condition is that a drx-RetransmissionTimerUL is running, wherein the drx-RetransmissionTimerUL is configured for the cDRX group or other cDRX groups. The fifth condition is that a scheduling request is sent on PUCCH (physical uplink control channel) in a same cDRX group, or in any cDRX groups, and is pending.

In some embodiments, the wireless communication device is currently using the first DRX configuration. In some embodiments, the first DRX configuration includes a first drx-Retransmission downlink timer and/or a first drx-Retransmission uplink timer, and the second DRX configuration includes a second drx-Retransmission downlink timer and/or a second drx-Retransmission uplink timer. In some embodiments, the wireless communication device determines to be in an active state based on at least one of the following conditions. The first condition is identifying that either the first drx-Retransmission downlink timer is running or the second drx-Retransmission downlink timer is running. The second condition is identifying that either the first drx-Retransmission uplink timer is running or the second drx-Retransmission uplink timer is running. The third condition is identifying that a scheduling request, that is pending, has been sent in the first subset of cells. The fourth condition is identifying that a scheduling request, that is pending, has been sent in any of the first subset of cells and the second subset of cells.

After receiving a random access response (RAR) message from the first cDRX group, the UE determines that the contention free random access channel (RACH) is done. In some embodiments, the UE needs to stay awake to monitor the PDCCH in the first cDRX group until receiving a PDCCH that matches the UE's cell-radio network temporary identifier (C-RNTI). In some embodiments, the UE needs to stay awake to monitor the PDCCH in any cDRX group until receiving a PDCCH that matches the UE's C-RNTI.

In some embodiments, the wireless communication device receives, from a wireless communication node in the first subset of cells, a random access response message to determine to be in an active state. In some embodiments, the wireless communication device remains in the active state until receiving a physical downlink control channel (PDCCH) over the first subset of cells that is addressed to a corresponding cell-radio network temporary identifier (C-RNTI). In some embodiments, the wireless communication device remains in the active state until receiving the PDCCH over any of the first subset of cells and the second subset of cells that is addressed to the C-RNTI. In some embodiments, the wireless communication device remains in the active state until receiving the PDCCH over any of the first subset of cells that is addressed to the C-RNTI and the second subset of cells that is addressed to the C-RNTI. In some embodiments, the wireless communication device remains in the active state until receiving a physical downlink control channel (PDCCH) over aPcDRX group (primary cDRX group) that is addressed to a corresponding cell-radio network temporary identifier (C-RNTI). In some embodiments, the PcDRX group is a cDRX group where PCell (Primary Cell) is included.

Some embodiments define a behavior of drx-inactivity Timer for multiple cDRX groups. In some embodiments, the drx-inactivityTimer starts and stops based on various triggers. In some embodiments, the drx-inactivityTimer starts responsive to at least one of the following conditions. The first condition is that a DCI (downlink control information) addressing new UL/DL transmission being received on a PDCCH is from a same cDRX group as the drx-inactivityTimer. The second condition is that a DCI addressing new UL/DL transmission being received on a PDCCH is from any cDRX groups. In some embodiments, the drx-inactivity Timer stops responsive to at least one of the following conditions. The first condition is a reception of long DRX command MAC (medium access control) CE (control element) or a short DRX MAC CE from the same cDRX group with drx-inactivityTimer. The second condition is a reception of a long DRX command MAC CE or a short DRX command MAC CE from the any cDRX groups.

In some embodiments, the wireless communication device is currently using the first DRX configuration associated with the first cDRX group. In some embodiments, the first DRX configuration includes a drx-Inactivity timer. In some embodiments, the wireless communication device starts the drx-Inactivity timer in response to at least one of the following conditions. The first condition is receiving a physical downlink control channel (PDCCH) addressing new DL or UL transmission in the first subset of cells. The second condition is receiving a physical downlink control channel (PDCCH) addressing new DL or UL transmission in any of the first subset of cells and the second subset of cells. In some embodiments, the wireless communication device stops the drx-Inactivity timer in response to at least one of the following conditions. The first condition is receiving a DRX command MAC control element (CE) (e.g., a long DRX command MAC CE or a short DRX command MAC CE) corresponding to the first subset of cells. The second condition is receiving a DRX command MAC control element (CE)) (e.g., a long DRX command MAC CE or a short DRX command MAC CE) corresponding to any of the first subset of cells and the second subset of cells.

A DRX cycle can include a short DRX cycle (e.g., shortDRX-cycle). In some embodiments, the shortDRX-cycle that can be implemented within the 'OFF' period of a long DRX Cycle. In some embodiments, the drx-ShortCycleTimer is the consecutive number of subframes the UE follows the shortDRX-cycle after the drx-inactivity Timer has expired. In some embodiments, the drx-ShortCycleTimer starts, restarts, or stops based on various triggers.

Some embodiments define a behavior of drx-ShortCycleTimer for multiple cDRX groups. In some embodiments, the drx-ShortCycleTimer starts or restarts responsive to at least one of the following conditions. The first condition is a reception of a short DRX command MAC CE from a same cDRX group. The second condition is a reception of a short DRX command MAC CE from any cDRX group. The third condition is an expiration of the drx-inactivityTimer that is configured to the same cDRX group. The fourth condition is an expiration of the drx-inactivity Timer that is configured to the any cDRX group. In some embodiments, the drx-ShortCycleTimer stops responsive to at least one of the following conditions. The first condition is a reception of a long DRX command MAC CE from the same cDRX group. The second condition is a reception of a long DRX command MAC CE from any cDRX group.

In some embodiments, the wireless communication device is currently using the first DRX configuration. In some embodiments, the first DRX configuration includes a drx-ShortCycle timer. In some embodiments, the wireless communication device either starts or restarts the drx-ShortCycle timer in response to at least one of the following conditions. The first condition is receiving a DRX command MAC control element (CE) (e.g., a long DRX command MAC CE or a short DRX command MAC CE) corresponding to the first subset of cells. The second condition is receiving a DRX command MAC control element (CE)) (e.g., a long DRX command MAC CE or a short DRX command MAC CE) corresponding to any of the first subset of cells and the second subset of cells.

In some embodiments, the wireless communication device starts the drx-ShortCycle timer configured in the first cDRX group in response to identifying that the drx-Inactivity timer of the first cDRX group is expired. In some embodiments, the second DRX configuration includes a second drx-Inactivity timer. In some embodiments, the wireless communication device starts the drx-ShortCycle timer configured in the first cDRX group in response to identifying that any of the first drx-Inactivity timer and second drx-Inactivity timer is expired. In some embodiments, the wireless communication device stops the drx-ShortCycle timer configured in the first cDRX group in response to receiving a long DRX command MAC control element (CE) from the first subset of cells and receiving a long DRX command MAC control element (CE) from any of the first subset of cells and the second subset of cells.

In the current release, the long DRX command MAC CE is a subheader (similar to a MAC CE). Some embodiments implement the long DRX command MAC CE for each cDRX group. In some embodiments, for the first cDRX group, the UE only applies a long DRX command MAC CE received in the first cDRX group. In some embodiments, for the first cDRX group, the UE supports applying a long DRX command MAC CE received from a different cDRX group. In some embodiments, the UE applies a long DRX command MAC CE to all configured cDRX groups. In some embodiments, a subheader-like format of long DRX command MAC CE is reused (e.g., when applying the long DRX command MAC CE to the cDRX group where the long DRX command MAC CE is received and/or applying the long DRX command MAC CE to all configured cDRX groups). In some embodiments, the long DRX command MAC CE is modified to add a payload to indicate which cDRX group will apply the MAC CE (e.g., when supporting applying the long DRX command MAC CE received in the different cDRX group). This payload include a cDRX group identifier or a cDRX group indicator.

In some embodiments, the wireless communication device is currently using the first DRX configuration. In some embodiments, the first DRX configuration (e.g., the configuration of the first cDRX group) includes a DRX command MAC control element (CE) (e.g., a long DRX command MAC CE or a short DRX command MAC CE). In some embodiments, the wireless communication device applies the DRX command MAC CE to the first subset of cells. In some embodiments, the wireless communication device applies the DRX command MAC CE to the second subset of cells, wherein the DRX command MAC CE includes a payload indicating the second subset of cells. In some embodiments, the wireless communication device applies the DRX command MAC CE to both of the first subset of cells and the second subset of cells.

In some embodiments, CSI (channel state information) reporting is a two-step process that includes measuring and reporting. Currently, when the UE is configured for DRX, UE needs to determine whether to perform the CSI report based on the active status at a time point of the CSI report. In some embodiments, the BS configures the UE to identify the subsets of cells where measuring and reporting is to be performed. However, if a PUCCH SCell (secondary cell) where the CSI report is performed is located in a different cDRX group than a corresponding SCell where the CSI measurement is performed, the current release does not define UE behavior on whether to report the CSI under such scenario.

Some embodiments implement the CSI report for multiple cDRX groups. In some embodiments, the UE identifies that reporting of the CSI is to be performed on the cell (e.g., the cell, a cell group, a DRX group, and/or a cDRX group). In some embodiments, whether to perform the CSI report is determined based on whether the UE is in the active status on the cell where the CSI report is performed. In some embodiments, whether to perform the CSI report is determined based on whether the UE is in the active status on the cell where the CSI measurement is performed. In some embodiments, whether to perform the CSI report is determined based on whether the UE is in the active status on any cells where the CSI measurement or the CSI report is performed.

In some embodiments, the wireless communication device is currently using the first DRX configuration. In some embodiments, the wireless communication device identifies that reporting of channel state information (CSI) is to be performed in the first subset of cells. In some embodiments, the wireless communication device determines whether to report the CSI based on at least one of the following conditions. The first condition is whether the wireless communication device is in an active state in the first subset of cells. The second condition is whether the wireless communication device is in an active state in either the first subset of cells or the second subset of cells where measuring of the CSI is to be performed. The third condition is whether the wireless communication device is in an active state in either the first subset of cells or the second subset of cells where either the reporting of the CSI or the measuring of the CSI is to be performed.

In some embodiments, the wireless communication device is currently using the first DRX configuration. In some embodiments, the wireless communication device needs to send SRS (sounding reference signal) in the first cDRX group for the serving cell, which is in the second cDRX group. The wireless communication device determines whether to report the SRS based on at least one of the following conditions. The first condition is whether the wireless communication device is in an active state in the first subset of cells. The second condition is whether the wireless communication device is in an active state in either the first subset of cells or the second subset of cells where SRS is sending for. The third condition is whether the wireless communication device is in an active state in either the first subset of cells or the second subset of cells where either the sending SRS or for which sending SRS is to be performed. The fourth condition is whether the wireless communication device in an active state in cDRX group that is related to the PUCCH group that is used for sending SRS.

In rel-16, a WUS (wake-up signal) is linked to cDRX in order to save power consumption. The WUS signal is used for indicating to the UE to wake up to monitor the PDCCH for the next one or multiple onduration times. However, in rel-16, only one cDRX configuration is configured per MAC. In some embodiments where multiple cDRX groups are configured, in order to improve power efficiency, one WUS is linked to one cDRX group instead of a whole CG (cell group).

Some embodiments include a mechanism of WUS for adapting to the scenario of multiple cDRX groups in one given CG. In some embodiments, the WUS includes a cDRX group identifier. In some embodiments, the UE receives (e.g., receives, transmits, or uses) one specific WUS to indicate a cDRX group. In some embodiments, the UE determines whether to wake up to monitor the PDCCH from one cDRX group based on the indication included in WUS. In some embodiments, the UE determines whether to wake up to monitor the PDCCH from one cDRX group based on the indication of a corresponding WUS.

In some embodiments, the wireless communication device is currently using the first DRX configuration. In some embodiments, the wireless communication device receives at least one of a global wake-up signal (WUS) that includes an identifier corresponding to either the first subset of cells or the second subset of cells or a specific wake-up signal (WUS) that corresponds to either the first subset of cells or the second subset of cells.

Since SCells configured to UE may not be SFN (system frame number) aligned, for saving the power of monitoring PDCCH, in some embodiments, the UE active status on all serving cells of one group is kept aligned. Some embodiments calculate the start point (e.g., start time, or drx-StartOffset) of an onDuration timer for each cDRX group. In some embodiments, for short DRX cycle, [(SFN+SFN OFFSET)×10+subframe number] modulo (drx-ShortCycle)= (drx-StartOffset) modulo (drx-ShortCycle)=drx-StartOffset. In some embodiments, for long DRX cycle, [(SFN+SFN OFFSET)×10+subframe number] modulo (drx-LongCycle) =drx-StartOffset. In some embodiments, the SFN represents the SFN number of the cDRX group. In some embodiments, SFN OFFSET represents the SFN gap between this cDRX group and PCell. In some embodiments, the SFN number of the cDRX group can be derived from one specific serving cell in this cDRX group. In some embodiments, the SFN represents the SFN number of the Primary cell (Pcell). In some embodiments, SFN OFFSET represents the SFN gap between the cDRX group and the PCell.

In some embodiments, the first DRX configuration includes a first onDuration timer and the second DRX configuration includes a second onDuration timer. In some embodiments, a starting timing of the first onDuration timer is related to a system frame number (SFN) offset between an SFN of the first subset of cells and a primary cell and a starting timing of the second onDuration timer is related to an SFN offset between an SFN of the second subset of cells and the primary cell.

Some embodiments include an interaction between a master node (MN) and a slavery node (SN) for a cDRX group configuration. In some embodiments, the cell group information message from MN to SN includes all configured cDRX configurations in MN. In some embodiments, the cell group information message from SN to MN include all configured cDRX configuration in SN. In some embodiments, a CU (Central Unit) notify a DU (distributed Unit) to release one or multiple cDRX groups.

In some embodiments, the wireless communication device (UE) sends an assistance information to another wireless communication device (NW). In some embodiments, the assistance information is to inform the NW with a cDRX configuration (e.g., the UE's favorite cDRX configuration). In some embodiments, this cDRX configuration is assistance information is for each cDRX group or PUCCH group. In some embodiments, the cDRX configuration in assistance information includes at least one of the following parameters: serving cell ID/serving cell ID list, PUCCH group Identifier, drx_ondurationTimer, drx_inactivityTimer, drx-HARX-RTT-TimerDL, drx-HARQ-RTT-TimerUL, drx-RetransmissionTimerDL, or drx-RetransmissionTimerUL.

Figure 3:
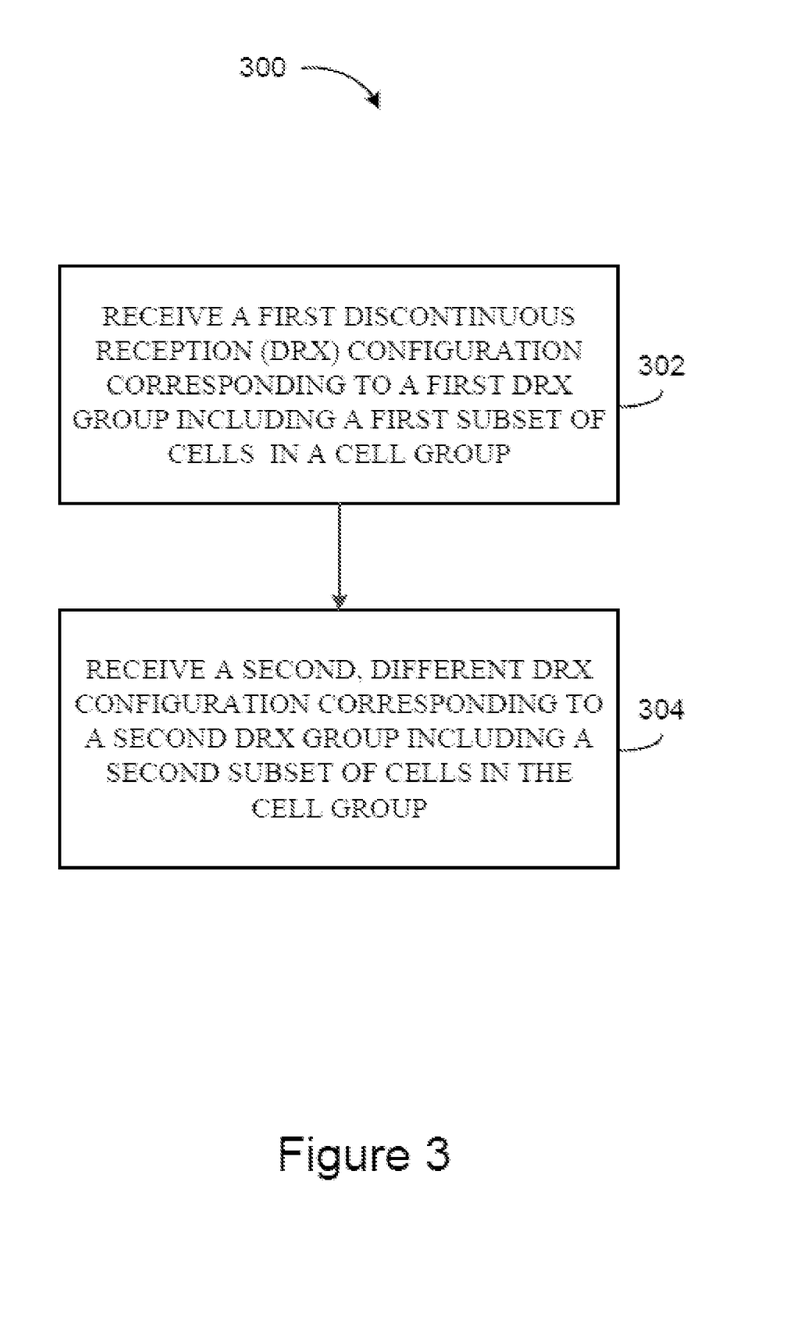
FIG. 3 illustrates a flowchart diagram illustrating a method of multiple discontinuous receptions for one cell group, in accordance with some embodiments of the present disclosure.

FIG. 3 illustrates a flowchart diagram illustrating a method 300 of multiple discontinuous receptions for one cell group, in accordance with some embodiments of the present disclosure. Referring to FIGS. 1-2, the method 300 is performed by the UE 104 and/or the UE 204, in some embodiments. Additional, fewer, or different operations may be performed in the method 300 depending on the embodiment.

A wireless communication device receives a first discontinuous reception (DRX) configuration corresponding to a first DRX group including a first subset of cells (e.g., a first cDRX group) in a cell group (302). The wireless communication device receives a second, different DRX configuration corresponding to a second DRX group including a second subset of cells (e.g., a second cDRX group) in the cell group (304). In some embodiments, the wireless communication devices receives the first DRX and/or the second DRX from a wireless communication node.

In some embodiments, the wireless communication device is currently using the first DRX configuration. In some embodiments, the first DRX configuration includes a first drx-Retransmission downlink timer and/or a first drx-Retransmission uplink timer, and the second DRX configuration includes a second drx-Retransmission downlink timer and/or a second drx-Retransmission uplink timer. In some embodiments, the wireless communication device determines to be in an active state based on at least one of the following conditions. The first condition is identifying that either the first drx-Retransmission downlink timer is running or the second drx-Retransmission downlink timer is running. The second condition is identifying that either the first drx-Retransmission uplink timer is running or the second drx-Retransmission uplink timer is running. The third condition is identifying that a scheduling request, which is pending, has been sent in the first subset of cells. The fourth condition is identifying that a scheduling request, which is pending, has been sent in any of the first subset of cells and the second subset of cells.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:
receiving, by a wireless communication device, a first discontinuous reception (DRX) configuration corresponding to a first DRX group including a first subset of cells in a cell group, wherein the first DRX configuration includes a first drx-Inactivity timer and a drx-ShortCycle timer, wherein the drx-ShortCycle timer included in the first DRX configuration is configured for both the first DRX group and a second DRX group;
receiving, by the wireless communication device, a second DRX configuration different from the first DRX configuration, the second DRX configuration corresponding to the second DRX group including a second subset of cells in the cell group, wherein the second DRX configuration includes a second drx-Inactivity timer;
starting or restarting, by the wireless communication device, the drx-ShortCycle timer for both the first DRX group and the second DRX group in response to receiving a DRX command MAC control element (CE) corresponding to any of the first subset of cells in the first DRX group and the second subset of cells in the second DRX group; and
starting, by the wireless communication device, the first drx-Inactivity timer in response to receiving a physical downlink control channel (PDCCH) for scheduling a new uplink (UL) or downlink (DL) transmission in the first subset of cells, wherein the first drx-Inactivity timer is included in the first DRX configuration corresponding to the first DRX group including the first subset of cells.

2. The wireless communication method of claim 1, further comprising:
receiving, by the wireless communication device, the PDCCH in the first subset of cells in the first DRX group.

3. The wireless communication method of claim 1, further comprising:
receiving, by the wireless communication device, a long DRX command MAC control element (CE) from any of the first subset of cells in the first DRX group and the second subset of cells in the second DRX group; and
stopping, by the wireless communication device, the drx-ShortCycle timer configured in the first DRX configuration, in response to the receiving of the long DRX command MAC CE.

4. The wireless communication method of claim 1, further comprising:
determining, by the wireless communication device, that reporting of channel state information (CSI) is to be performed in the first subset of cells in the first DRX group; and
determining, by the wireless communication device, whether to report the CSI according to whether the wireless communication device is in an active state in the first subset of cells in the first DRX group.

5. The wireless communication method of claim 1, further comprising:
determining, by the wireless communication device, that a sounding reference signal (SRS) is to be sent in the first subset of cells in the first DRX group; and
determining, by the wireless communication device, whether to send the SRS according to whether the wireless communication device is in an active state in the first subset of cells in the first DRX group.

6. The wireless communication method of claim 1, wherein
a system frame number (SFN) of a primary cell (Pcell) is used for calculating at least one of: a starting time of an onDurationTimer of the first DRX group, or a starting time of an onDuration Timer of the second DRX group.

7. A wireless communication device, comprising:
at least one processor configured to:
receive, via a receiver, a first discontinuous reception (DRX) configuration corresponding to a first DRX group including a first subset of cells in a cell group, wherein the first DRX configuration includes a first drx-Inactivity timer and a drx-ShortCycle timer, wherein the drx-ShortCycle timer included in the first DRX configuration is configured for both the first DRX group and a second DRX group;
receive, via the receiver, a second DRX configuration different from the first DRX configuration, the second DRX configuration corresponding to the second DRX group including a second subset of cells in the cell group, wherein the second DRX configuration includes a second drx-Inactivity timer;
start or restart the drx-ShortCycle timer for both the first DRX group and the second DRX group in response to receiving a DRX command MAC control element (CE) corresponding to any of the first subset of cells in the first DRX group and the second subset of cells in the second DRX group; and
start the first drx-Inactivity timer in response to receiving a physical downlink control channel (PDCCH) for scheduling a new uplink (UL) or downlink (DL) transmission in the first subset of cells, wherein the first drx-Inactivity timer is included in the first DRX configuration corresponding to the first DRX group including the first subset of cells.

8. The wireless communication device of claim 7, wherein the at least one processor is further configured to:
receive, via the receiver, the PDCCH in the first subset of cells in the first DRX group.

9. The wireless communication device of claim 7, wherein the at least one processor is further configured to:
receive, via the receiver, a long DRX command MAC control element (CE) from any of the first subset of cells in the first DRX group and the second subset of cells in the second DRX group; and
stop the drx-ShortCycle timer configured in the first DRX configuration, in response to the receiving of the long DRX command MAC CE.

10. The wireless communication device of claim 7, wherein the at least one processor is further configured to:
determine that reporting of channel state information (CSI) is to be performed in the first subset of cells in the first DRX group; and
determine whether to report the CSI according to whether the wireless communication device is in an active state in the first subset of cells in the first DRX group.

11. The wireless communication device of claim 7, wherein the at least one processor is further configured to:
determine that a sounding reference signal (SRS) is to be sent in the first subset of cells in the first DRX group; and
determine whether to send the SRS according to whether the wireless communication device is in an active state in the first subset of cells in the first DRX group.

12. The wireless communication device of claim 7, wherein
a system frame number (SFN) of a primary cell (Pcell) is used for calculating at least one of: a starting time of an onDurationTimer of the first DRX group, or a starting time of an onDuration Timer of the second DRX group.

13. A non-transitory computer readable medium storing instructions when executed by one or more processors of a wireless communication device, cause the one or more processors to:
receive, via a receiver, a first discontinuous reception (DRX) configuration corresponding to a first DRX group including a first subset of cells in a cell group, wherein the first DRX configuration includes a first drx-Inactivity timer and a drx-ShortCycle timer, wherein the drx-ShortCycle timer included in the first DRX configuration is configured for both the first DRX group and a second DRX group;
receive, via the receiver, a second DRX configuration different from the first DRX configuration, the second DRX configuration corresponding to the second DRX group including a second subset of cells in the cell group, wherein the second DRX configuration includes a second drx-Inactivity timer;
start or restart the drx-ShortCycle timer for both the first DRX group and the second DRX group in response to receiving a DRX command MAC control element (CE) corresponding to any of the first subset of cells in the first DRX group and the second subset of cells in the second DRX group; and
start the first drx-Inactivity timer in response to receiving a physical downlink control channel (PDCCH) for scheduling a new uplink (UL) or downlink (DL) transmission in the first subset of cells, wherein the first drx-Inactivity timer is included in the first DRX configuration corresponding to the first DRX group including the first subset of cells.

14. The non-transitory computer readable medium of claim 13, wherein the at least one processor is further caused to:
receive, via the receiver, the PDCCH in the first subset of cells in the first DRX group.

15. The non-transitory computer readable medium of claim 13, wherein the at least one processor is further caused to:
receive, via the receiver, a long DRX command MAC control element (CE) from any of the first subset of cells in the first DRX group and the second subset of cells in the second DRX group; and
stop the drx-ShortCycle timer configured in the first DRX configuration, in response to the receiving of the long DRX command MAC CE.

16. The non-transitory computer readable medium of claim 13, wherein the at least one processor is further caused to:
determine that reporting of channel state information (CSI) is to be performed in the first subset of cells in the first DRX group; and
determine whether to report the CSI according to whether the wireless communication device is in an active state in the first subset of cells in the first DRX group.

17. The non-transitory computer readable medium of claim 13, wherein the at least one processor is further caused to:
determine that a sounding reference signal (SRS) is to be sent in the first subset of cells in the first DRX group; and
determine whether to send the SRS according to whether the wireless communication device is in an active state in the first subset of cells in the first DRX group.

18. The non-transitory computer readable medium of claim 13, wherein a system frame number (SFN) of a primary cell (Pcell) is used for calculating at least one of: a starting time of an onDurationTimer of the first DRX group, or a starting time of an onDuration Timer of the second DRX group.

\* \* \* \* \*